(12) United States Patent
Chen

(10) Patent No.: US 11,088,856 B2
(45) Date of Patent: Aug. 10, 2021

(54) MEMORY STORAGE SYSTEM, HOST SYSTEM AUTHENTICATION METHOD AND MEMORY STORAGE DEVICE

(71) Applicant: PHISON ELECTRONICS CORP., Miaoli (TW)

(72) Inventor: Liang-Wei Chen, Miaoli County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 304 days.

(21) Appl. No.: 15/924,281

(22) Filed: Mar. 19, 2018

(65) Prior Publication Data
US 2019/0222427 A1    Jul. 18, 2019

(30) Foreign Application Priority Data

Jan. 15, 2018  (TW) .................................. 107101382

(51) Int. Cl.
| | | |
|---|---|---|
| G06F 21/10 | (2013.01) | |
| H04L 9/32 | (2006.01) | |
| H04L 9/08 | (2006.01) | |
| H04L 29/06 | (2006.01) | |
| G06F 21/44 | (2013.01) | |

(52) U.S. Cl.
CPC ............ H04L 9/3273 (2013.01); G06F 21/10 (2013.01); G06F 21/445 (2013.01); H04L 9/0825 (2013.01); H04L 63/0442 (2013.01); H04L 2209/16 (2013.01)

(58) Field of Classification Search
CPC ............... H04L 9/3273; H04L 2209/16; H04L 63/0442; H04L 9/0631; H04L 9/0825; H04L 63/0428; H04L 63/0869; G06F 21/10; G06F 21/445; G06F 21/32; G06F 1/28; G06F 21/81; G06K 9/00013
See application file for complete search history.

(56) References Cited

U.S. PATENT DOCUMENTS

| | | | |
|---|---|---|---|
| 8,353,054 B2 * | 1/2013 | Nguyen ................ | H04L 9/3226 726/30 |
| 10,185,670 B2 * | 1/2019 | Litichever ........... | G06F 13/4282 |
| 10,430,361 B1 * | 10/2019 | Wiebe .................. | G06F 3/0673 |

(Continued)

*Primary Examiner* — Trang T Doan
(74) *Attorney, Agent, or Firm* — JCIPRNET

(57) ABSTRACT

A memory storage system is provided according to an exemplary embodiment of the disclosure. The memory storage system includes a host system and a memory storage device. In a first handshake operation, the memory storage device transmits first encrypted information corresponding to first authentication information to the host system, and the host system transmits second encrypted information corresponding to the first authentication information to the memory storage device. In a second handshake operation, the memory storage device transmits third encrypted information corresponding to second authentication information to the host system, and the host system transmits fourth encrypted information corresponding to third authentication information to the memory storage device based on the third encrypted information. The third authentication information is configured to encrypt data transmitted between the host system and the memory storage device in a developer command transmission stage.

32 Claims, 11 Drawing Sheets

(56) References Cited

U.S. PATENT DOCUMENTS

| | | | |
|---|---|---|---|
| 2010/0186076 A1* | 7/2010 | Ali | G06Q 20/3576 |
| | | | 726/9 |
| 2013/0262810 A1* | 10/2013 | Chang | G06F 12/0246 |
| | | | 711/170 |
| 2014/0317350 A1* | 10/2014 | Langas | G06F 1/266 |
| | | | 711/115 |
| 2017/0109176 A1* | 4/2017 | Shih | G06F 9/4406 |
| 2018/0183792 A1* | 6/2018 | Buddhavaram | H04L 67/02 |

* cited by examiner

MEMORY STORAGE SYSTEM, HOST SYSTEM AUTHENTICATION METHOD AND MEMORY STORAGE DEVICE

CROSS-REFERENCE TO RELATED APPLICATION

This application claims the priority benefit of Taiwan application serial no. 107101382, filed on Jan. 15, 2018. The entirety of the above-mentioned patent application is hereby incorporated by reference herein and made a part of this specification.

BACKGROUND

Technical Field

The disclosure relates to an encrypted communication technique, and in particular, to a memory storage system, a host system authentication method, and a memory storage device.

Description of Related Art

As digital cameras, mobile phones, and MP3 players have been growing rapidly in recent years, consumers' demand for storage media has also been growing significantly. With characteristics including data non-volatility, energy saving, small size, lack of mechanical structures, etc., rewritable non-volatile memory modules (e.g., flash memories) are ideal to be built in various portable multi-media devices such as those listed above.

Before a memory storage device leaves the factory or when a memory storage device is sent back to the original manufacturer for repairs, a developer may issue a developer command to the memory storage device by using a developer tool provided by the original manufacturer to perform system update operations (e.g., a parameter update or a firmware update) on the memory storage device through the developer command. However, most memory storage devices can only authenticate the developer tool of the host system through simple passwords. Therefore, once an attacker obtains this password the attacker can easily alter system parameters of the memory storage device or steal data from the memory storage device by pretending to be the developer.

Nothing herein should be construed as an admission of knowledge in the prior art of any portion of the present disclosure. Furthermore, citation or identification of any document in this application is not an admission that such document is available as prior art to the present disclosure, or that any reference forms a part of the common general knowledge in the art.

SUMMARY

The embodiments of the disclosure provide a memory storage system, a host system authentication method, and a memory storage device that strengthen a capability of authenticating a host system by the memory storage device.

An exemplary embodiment of the disclosure provides a memory storage system. The memory storage system includes a host system and a memory storage device. The memory storage device is coupled to the host system. In a first handshake operation, the memory storage device is configured to transmit first encrypted information corresponding to first authentication information to the host system, the host system is configured to transmit second encrypted information corresponding to the first authentication information to the memory storage device, and the memory storage device is configured to authenticate whether the host system is allowed to perform a second handshake operation by the second encrypted information. In the second handshake operation, the memory storage device is configured to transmit third encrypted information corresponding to second authentication information to the host system, the host system is configured to transmit fourth encrypted information corresponding to third authentication information to the memory storage device based on the third encrypted information, and the memory storage device is configured to authenticate whether the host system is allowed to perform a developer command transmission stage by the fourth encrypted information. The third authentication information is configured to encrypt data transmitted between the host system and the memory storage device in the developer command transmission stage.

Another exemplary embodiment of the disclosure provides a host system authentication method for a memory storage device. The host system authentication method includes: in a first handshake operation with a host system, transmitting first encrypted information corresponding to first authentication information to the host system, receiving second encrypted information corresponding to the first authentication information from the host system, and authenticating whether the host system is allowed to perform a second handshake operation by the second encrypted information; in the second handshake operation with the host system, transmitting third encrypted information corresponding to second authentication information to the host system, receiving fourth encrypted information corresponding to third authentication information from the host system, and authenticating whether the host system is allowed to perform a developer command transmission stage by the fourth encrypted information; and in the developer command transmission stage, analyzing a developer command received from the host system according to the third authentication information.

Another exemplary embodiment of the disclosure provides a memory storage device including a connection interface unit, a rewritable non-volatile memory module, and a memory control circuit unit. The connection interface unit is configured to couple to a host system. The rewritable non-volatile memory module includes a plurality of physical units. The memory control circuit unit is coupled to the connection interface unit and the rewritable non-volatile memory module. In a first handshake operation with the host system, the memory control circuit unit is configured to transmit first encrypted information corresponding to first authentication information to the host system, receive second encrypted information corresponding to the first authentication information from the host system, and authenticate whether the host system is allowed to perform a second handshake operation by the second encrypted information. In the second handshake operation with the host system, the memory control circuit unit is further configured to transmit third encrypted information corresponding to second authentication information to the host system, receive fourth encrypted information corresponding to third authentication information from the host system, and authenticate whether the host system is allowed to perform a developer command transmission stage by the fourth encrypted information. In the developer command transmission stage, the memory control circuit unit is further configured to analyze a developer command received from the host system according to the third authentication information.

Another exemplary embodiment of the disclosure provides a memory storage device including a connection interface unit, a rewritable non-volatile memory module, and a memory control circuit unit. The connection interface unit is configured to couple to a host system. The rewritable non-volatile memory module includes a plurality of physical units. The memory control circuit unit is coupled to the connection interface unit and the rewritable non-volatile memory module. The memory control circuit unit is configured to authenticate the host system according to first authentication information in a first handshake operation with the host system. The memory control circuit unit is further configured to authenticate the host system according to second authentication information in a second handshake operation with the host system. In a developer command transmission stage, the memory control circuit unit is configured to analyze a developer command received from the host system according to third authentication information. The first authentication information, the second authentication information, and the third authentication information are different from each other.

Accordingly, the memory storage device authenticates the host system in at least two handshake operations according to different authentication information, and the information transmitted in the handshake operations is all encrypted. Moreover, through the handshake operations, the memory storage device and the host system exchange the authentication information configured to encrypt data and/or analyze the developer commands in the developer command transmission stage, which thereby strengthens a capability of authenticating the host system by the memory storage device.

To provide a further understanding of the aforementioned and other features and advantages of the disclosure, exemplary embodiments, together with the reference drawings, are described in detail below.

It should be understood, however, that this Summary may not contain all of the aspects and embodiments of the present disclosure, is not meant to be limiting or restrictive in any manner, and that the disclosure as disclosed herein is and will be understood by those of ordinary skill in the art to encompass obvious improvements and modifications thereto.

DESCRIPTION OF THE EMBODIMENTS

Figure 1:
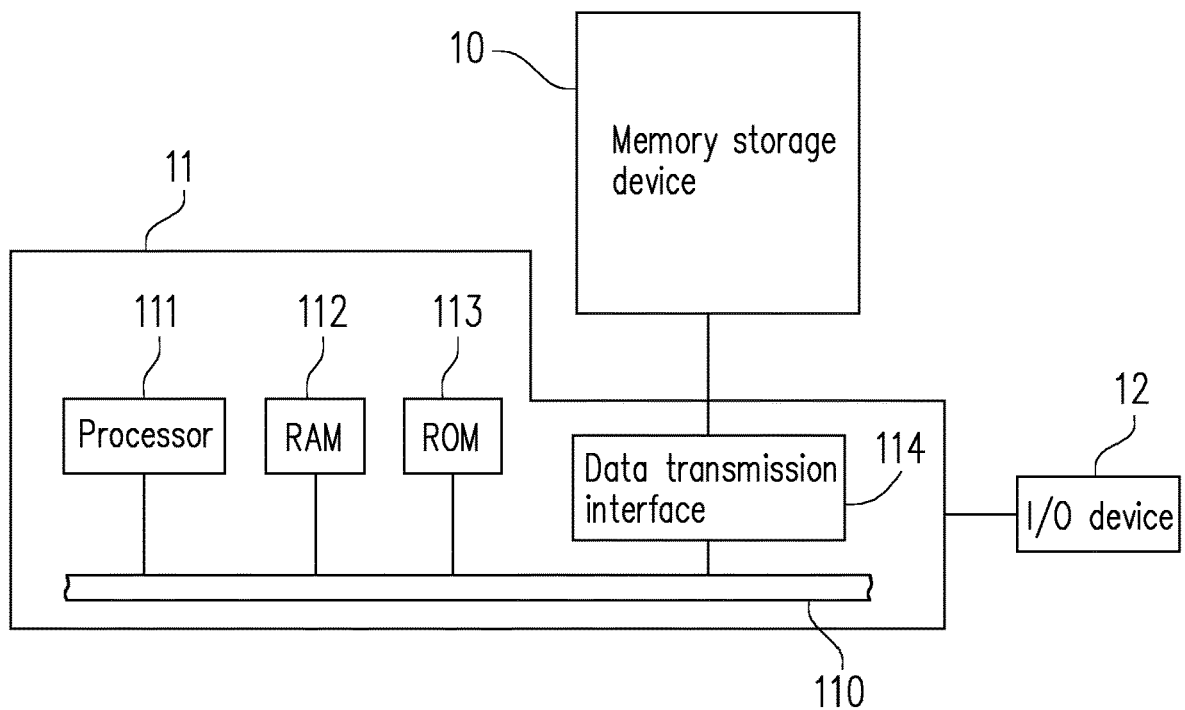
FIG. 1 is a schematic diagram illustrating a host system, a memory storage device, and an input/output (I/O) device according to an exemplary embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Embodiments of the present disclosure may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage device (also referred to as a memory storage system) includes a rewritable non-volatile memory module and a controller (also referred to as a control circuit). The memory storage device is usually used together with a host system, such that the host system can write data to the memory storage device or read data from the memory storage device.

Figure 2:
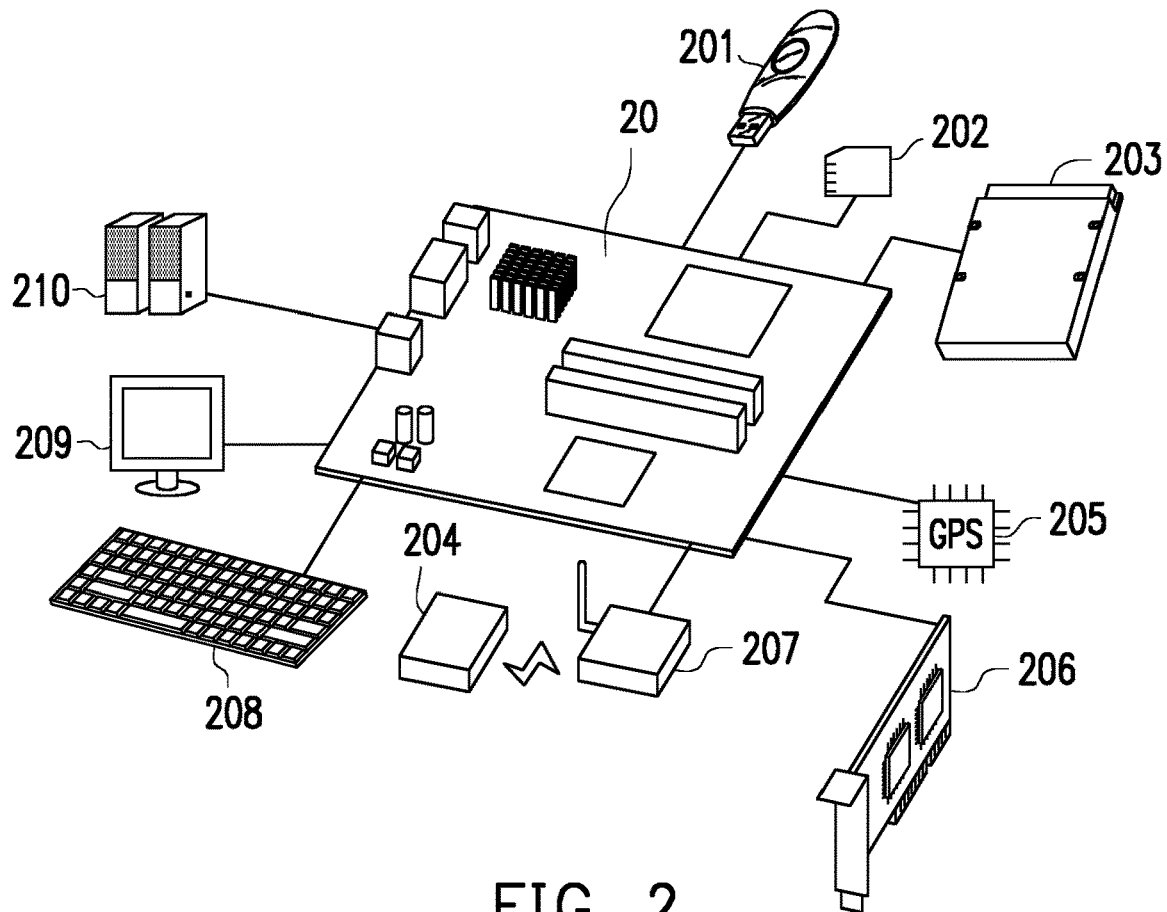
FIG. 2 is a schematic diagram illustrating a host system, a memory storage device, and an I/O device according to another exemplary embodiment of the disclosure.

FIG. 1 is a schematic diagram illustrating a host system, a memory storage device, and an input/output (I/O) device according to an exemplary embodiment of the disclosure. FIG. 2 is a schematic diagram illustrating a host system, a memory storage device, and an I/O device according to another exemplary embodiment of the disclosure.

Referring to FIG. 1 and FIG. 2, a host system 11 generally includes a processor 111, a random access memory (RAM) 112, a read only memory (ROM) 113, and a data transmission interface 114. The processor 111, the random access memory 112, the read only memory 113, and the data transmission interface 114 are all coupled to a system bus 110.

In the present exemplary embodiment, the host system 11 is coupled to a memory storage device 10 via the data transmission interface 114. For example, the host system 11 may store data to the memory storage device 10 or read data from the memory storage device 10 via the data transmission interface 114. Moreover, the host system 11 is coupled to the I/O device 12 via the system bus 110. For example, the host system 11 may transmit output signals to the I/O device 12 or receive input signals from the I/O device 12 via the system bus 110.

In the present exemplary embodiment, the processor 111, the random access memory 112, the read only memory 113, and the data transmission interface 114 may be installed on a motherboard 20 of the host system 11. The number of the data transmission interface 114 may be one or more. The motherboard 20 may be coupled to the memory storage device 10 via the data transmission interface 114 in wired or wireless manners. The memory storage device 10 is, for example, a flash drive 201, a memory card 202, a solid state drive (SSD) 203, or a wireless memory storage device 204. The wireless memory storage device 204 is, for example, a memory storage device based on various wireless communication technologies, such as a near field communication (NFC) memory storage device, a WiFi memory storage device, a Bluetooth memory storage device, and a Bluetooth low energy (BLE) memory storage device (e.g., iBeacon). Moreover, the motherboard 20 may also be coupled via the system bus 110 to various I/O devices, such as a global positioning system (GPS) module 205, a network interface card 206, a wireless transmission device 207, a keyboard 208, a display 209, and a speaker 210. For example, in an exemplary embodiment, the motherboard 20 may access the wireless memory storage device 204 via the wireless transmission device 207.

Figure 3:
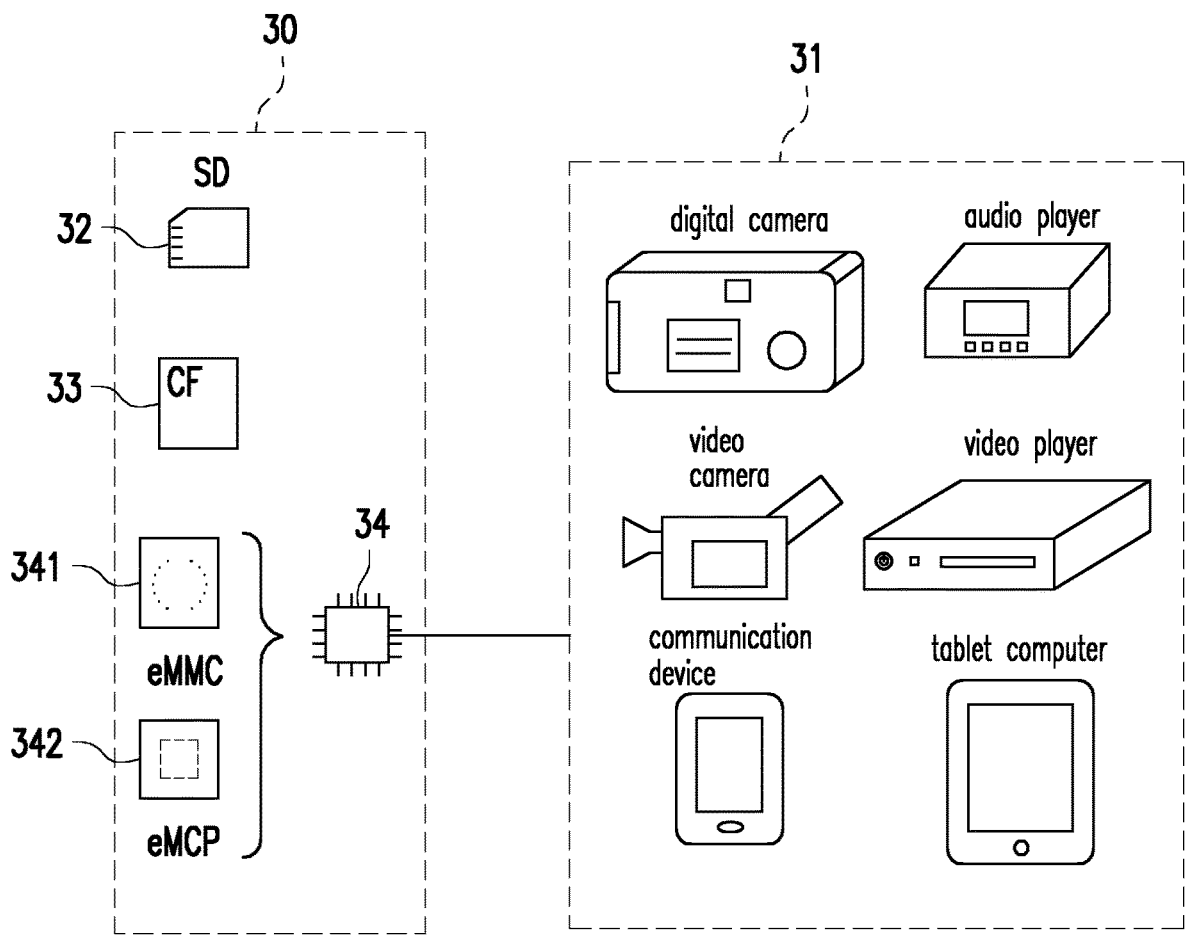
FIG. 3 is a schematic diagram illustrating a host system and a memory storage device according to another exemplary embodiment of the disclosure.

In an exemplary embodiment, the foregoing host system is any system that substantially works with the memory storage device to store data. In the exemplary embodiment above, the host system is illustrated with a computer system. However, FIG. 3 is a schematic diagram illustrating a host system and a memory storage device according to another exemplary embodiment of the disclosure. Referring to FIG. 3, in another exemplary embodiment, a host system 31 may also be a system such as a digital camera, a video camera, a communication device, an audio player, a video player, a tablet computer, etc. A memory storage device 30 may be any one of various types of non-volatile memory storage devices used by the host system 31, such as a secure digital (SD) card 32, a compact flash (CF) card 33, an embedded storage device 34, etc. The embedded storage device 34 is any of various types of embedded storage devices directly coupling a memory module to a substrate of the host system, such as an embedded multi media card (eMMC) 341 and/or an embedded multi chip package (eMCP) storage device 342.

Figure 4:
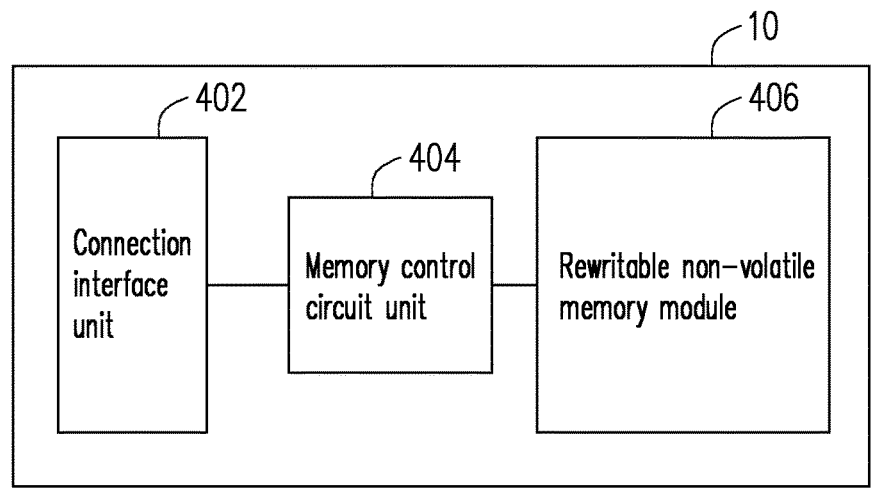
FIG. 4 is a schematic block diagram illustrating a memory storage device according to an exemplary embodiment of the disclosure.

FIG. 4 is a schematic block diagram illustrating a memory storage device according to an exemplary embodiment of the disclosure.

Referring to FIG. 4, the memory storage device 10 includes a connection interface unit 402, a memory control circuit unit 404, and a rewritable non-volatile memory module 406.

The connection interface unit 402 is configured to couple the memory storage device 10 to the host system 11. In the present exemplary embodiment, the connection interface unit 402 is compatible with the Serial Advanced Technology Attachment (SATA) standard. However, it is understood that the disclosure is not limited hereto. The connection interface unit 402 may also be compatible with the Parallel Advanced Technology Attachment (PATA) standard, the Institute of Electrical and Electronic Engineers (IEEE) 1394 standard, the Peripheral Component Interconnect Express (PCI Express) standard, the Universal Serial Bus (USB) standard, the SD interface standard, the Ultra High Speed-I (UHS-I) interface standard, the Ultra High Speed-II (UHS-II) interface standard, the Memory Stick (MS) interface standard, the MCP interface standard, the MMC interface standard, the eMMC interface standard, the Universal Flash Storage (UFS) interface standard, the eMCP interface standard, the CF interface standard, the Integrated Device Electronics (IDE) standard, or other suitable standards. The connection interface unit 402 may be packaged with the memory control circuit unit 404 in one single chip, or the connection interface unit 402 may be disposed outside a chip including the memory control circuit unit 404.

The memory control circuit unit 404 is configured to execute a plurality of logic gates or control commands implemented in a hardware form or a firmware form, and perform operations, such as data writing, reading, erasing, etc., in the rewritable non-volatile memory module 406 according to commands of the host system 11. The rewritable non-volatile memory module 406 is coupled to the memory control circuit unit 404 and is configured to store data written by the host system 11. The rewritable non-volatile memory module 406 may be a single level cell (SLC) NAND flash memory module (i.e., a flash memory module capable of storing 1 bit in one memory cell), a multi level cell (MLC) NAND flash memory module (i.e., a flash memory module capable of storing 2 bits in one memory cell), a triple level cell (TLC) NAND flash memory module (i.e., a flash memory module capable of storing 3 bits in one memory cell), another flash memory module, or any other memory modules with the same characteristics.

In the rewritable non-volatile memory module 406, one or more bits are stored by changing a voltage (hereinafter also referred to as a threshold voltage) of each of the memory cells. More specifically, in each of the memory cells, a charge trapping layer is provided between a control gate and a channel. An amount of electrons in the charge trapping layer may be changed by applying a write voltage to the control gate, thereby changing the threshold voltage of the memory cell. This operation of changing the threshold voltage of the memory cell is also known as "writing data to the memory cell" or "programming the memory cell". As the threshold voltage changes, each of the memory cells in the rewritable non-volatile memory module 406 has a plurality of storage states. The storage state to which a memory cell belongs may be determined by applying a read voltage, thereby obtaining the one or more bits stored in the memory cell.

In the present exemplary embodiment, the memory cells of the rewritable non-volatile memory module 406 constitute a plurality of physical programming units, and the physical programming units constitute a plurality of physical erasing units. Specifically, the memory cells on the same word line constitute one or more of the physical programming units. If each of the memory cells can store two bits or more, the physical programming units on the same word line can be at least classified into a lower physical programming unit and an upper physical programming unit. For example, a least significant bit (LSB) of one memory cell belongs to the lower physical programming unit, and a most significant bit (MSB) of one memory cell belongs to the upper physical programming unit. Generally, in the MLC NAND flash memory, a writing speed of the lower physical programming unit is higher than a writing speed of the upper physical programming unit, and/or a reliability of the lower physical programming unit is higher than a reliability of the upper physical programming unit.

In the present exemplary embodiment, the physical programming unit is the minimal unit for programming. In other words, the physical programming unit is the minimal unit for writing data. For example, the physical programming unit is a physical page or a physical sector. When the physical programming unit is the physical page, the physical programming units usually include a data bit area and a redundancy bit area. The data bit area includes a plurality of physical sectors for storing user data, and the redundancy bit area is configured to store system data (e.g., management data such as an error correcting code). In the present exemplary embodiment, the data bit area includes 32 physical sectors, and a size of one physical sector is 512 bytes (B). However, in other exemplary embodiments, the data bit area may also include 8 or 16 physical sectors or physical sectors of a greater or smaller number, and the size of each physical sector may also be greater or smaller. On the other hand, the physical erasing unit is the minimal unit for erasing. Namely, each physical erasing unit contains the least number of memory cells to be erased altogether. For example, the physical erasing unit is a physical block.

Figure 5:
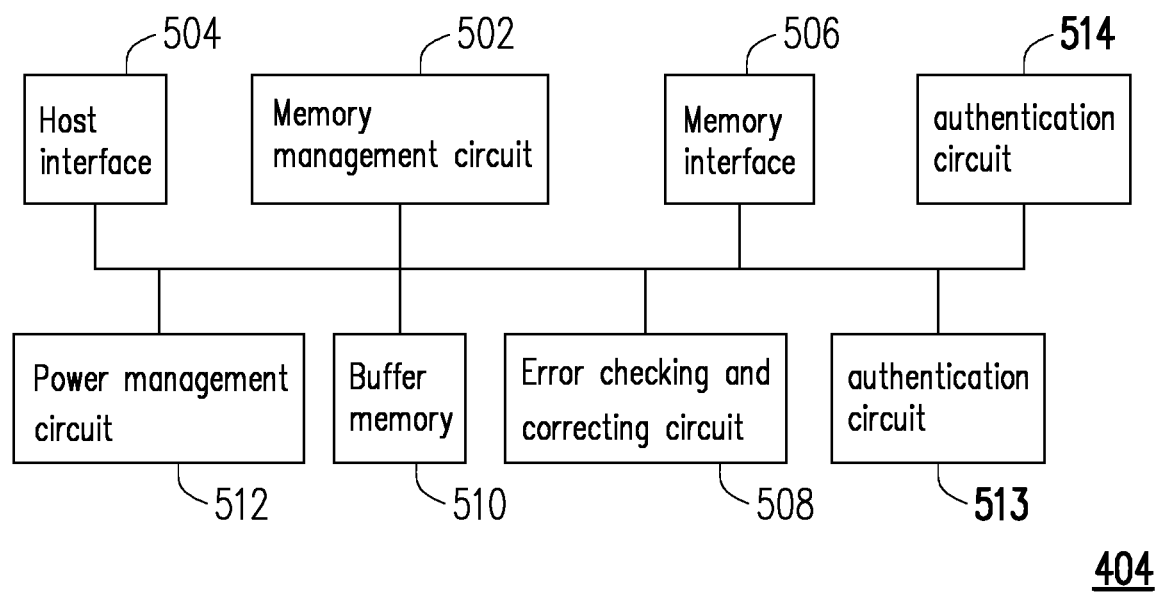
FIG. 5 is a schematic block diagram illustrating a memory control circuit unit according to an exemplary embodiment of the disclosure.

FIG. 5 is a schematic block diagram illustrating a memory control circuit unit according to an exemplary embodiment of the disclosure.

Referring to FIG. 5, the memory control circuit unit 404 includes a memory management circuit 502, a host interface 504, and a memory interface 506.

The memory management circuit 502 is configured to control overall operations of the memory control circuit unit 404. Specifically, the memory management circuit 502 has a plurality of control commands, and when the memory storage device 10 is operated, the control commands are executed to perform operations of data writing, reading, and erasing. Hereinafter, the description of operations of the memory management circuit 502 is regarded as equivalent to describing operations of the memory control circuit unit 404.

In the present exemplary embodiment, the control commands of the memory management circuit 502 are implemented in a firmware form. For example, the memory management circuit 502 includes a microprocessor unit (not illustrated) and a read only memory (not illustrated), wherein the control commands are burnt into the read only memory. When the memory storage device 10 is operated, the control commands are executed by the microprocessor unit to perform operations of data writing, reading, erasing, etc.

In another exemplary embodiment, the control commands of the memory management circuit 502 may also be stored as program codes in a specific area (for example, a system area in a memory module exclusively used for storing system data) of the rewritable non-volatile memory module 406. In addition, the memory management circuit 502 includes a microprocessor unit (not illustrated), a read only memory (not illustrated), and a random access memory (not illustrated). More particularly, the read only memory has a boot code, which is executed by the microprocessor unit to load the control commands stored in the rewritable non-volatile memory module 406 to the random access memory of the memory management circuit 502 when the memory control circuit unit 404 is enabled. Afterwards, the control commands are run by the microprocessor unit to perform operations of data writing, reading, erasing, etc.

Furthermore, in another exemplary embodiment, the control commands of the memory management circuit 502 may also be implemented in a hardware form. For example, the memory management circuit 502 includes a microprocessor, a memory cell management circuit, a memory writing circuit, a memory reading circuit, a memory erasing circuit, and a data processing circuit. The memory cell management circuit, the memory writing circuit, the memory reading circuit, the memory erasing circuit, and the data processing circuit are coupled to the microprocessor. The memory cell management circuit is configured to manage the memory cells of the rewritable non-volatile memory module 406 or a group thereof. The memory writing circuit is configured to issue a write command sequence for the rewritable non-volatile memory module 406 to write data to the rewritable non-volatile memory module 406. The memory reading circuit is configured to issue a read command sequence for the rewritable non-volatile memory module 406 to read data from the rewritable non-volatile memory module 406. The memory erasing circuit is configured to issue an erase command sequence for the rewritable non-volatile memory module 406 to erase data from the rewritable non-volatile memory module 406. The data processing circuit is configured to process data to be written to the rewritable non-volatile memory module 406 and data read from the rewritable non-volatile memory module 406. Each of the write command sequence, the read command sequence, and the erase command sequence may include one or more program codes or command codes for instructing the rewritable non-volatile memory module 406 to perform the corresponding operations such as data writing, reading, and erasing. In an exemplary embodiment, the memory management circuit 502 may further issue command sequences of other types for the rewritable non-volatile memory module 406 to instruct performing corresponding operations.

The host interface 504 is coupled to the memory management circuit 502 and is configured to receive and identify commands and data transmitted by the host system 11. In other words, the commands and the data transmitted by the host system 11 are transmitted to the memory management circuit 502 via the host interface 504. In the present exemplary embodiment, the host interface 504 is compatible with the SATA standard. However, it is understood that the disclosure is not limited hereto, and the host interface 504 may also be compatible with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or other suitable data transmission standards.

The memory interface 506 is coupled to the memory management circuit 502 and is configured to access the rewritable non-volatile memory module 406. In other words, data to be written to the rewritable non-volatile memory module 406 is converted into a format acceptable by the rewritable non-volatile memory module 406 through the memory interface 506. Specifically, if the memory management circuit 502 is to access the rewritable non-volatile memory module 406, the memory interface 506 transmits corresponding command sequences. For example, the command sequences may include the write command sequence for instructing writing data, the read command sequence for instructing reading data, the erase command sequence for instructing erasing data, and other corresponding command sequences for instructing performing various memory operations (e.g., changing a read voltage level or performing a garbage collection operation). These command sequences are generated by the memory management circuit 502 and are transmitted to the rewritable non-volatile memory module 406 through the memory interface 506, for example. The command sequences may include one or more signals, or data transmitted on the bus. The signals or the data may include command codes or program codes. For example, in a read command sequence, information such as read identification codes and memory addresses is included.

In an exemplary embodiment, the memory control circuit unit 404 further includes an error checking and correcting circuit 508, a buffer memory 510, and a power management circuit 512.

The error checking and correcting circuit 508 is coupled to the memory management circuit 502 and is configured to perform an error checking and correcting operation to ensure the correctness of data. Specifically, when the memory management circuit 502 receives the write command from the host system 11 the error checking and correcting circuit 508 generates an error correcting code (ECC) and/or an error detecting code (EDC) for data corresponding to the write command, and the memory management circuit 502 writes the data corresponding to the write command and the corresponding error correcting code and/or error detecting code to the rewritable non-volatile memory module 406. Afterwards, when reading the data from the rewritable non-volatile memory module 406, the memory management circuit 502 simultaneously reads the error correcting code and/or the error detecting code corresponding to the data, and the error checking and correcting circuit 508 performs the error checking and correcting operation on the read data according to the error correcting code and/or the error detecting code.

The buffer memory 510 is coupled to the memory management circuit 502 and is configured to temporarily store data and commands from the host system 11 or data from the rewritable non-volatile memory module 406. The power management circuit 512 is coupled to the memory management circuit 502 and is configured to control a power of the memory storage device 10.

In an exemplary embodiment, the memory control circuit unit 404 further includes authentication circuits 513 and 514. The authentication circuits 513 and 514 are both coupled to the memory management circuit 502 and both support encryption and decryption of data. In the present exemplary embodiment, the authentication circuit 513 uses an asymmetric encryption algorithm such as RSA, and the authentication circuit 514 uses a symmetric encryption algorithm such as the Advanced Encryption Standard (AES). However, in another exemplary embodiment, the authentication circuits 513 and/or 514 may support encryption algorithms of other types, as long as the authentication circuits 513 and 514 adopt different encryption algorithms. Moreover, in another exemplary embodiment, the authentication circuits 513 and/or 514 may be configured inside the memory management circuit 502 or may be implemented in a form of software/firmware.

Figure 6:
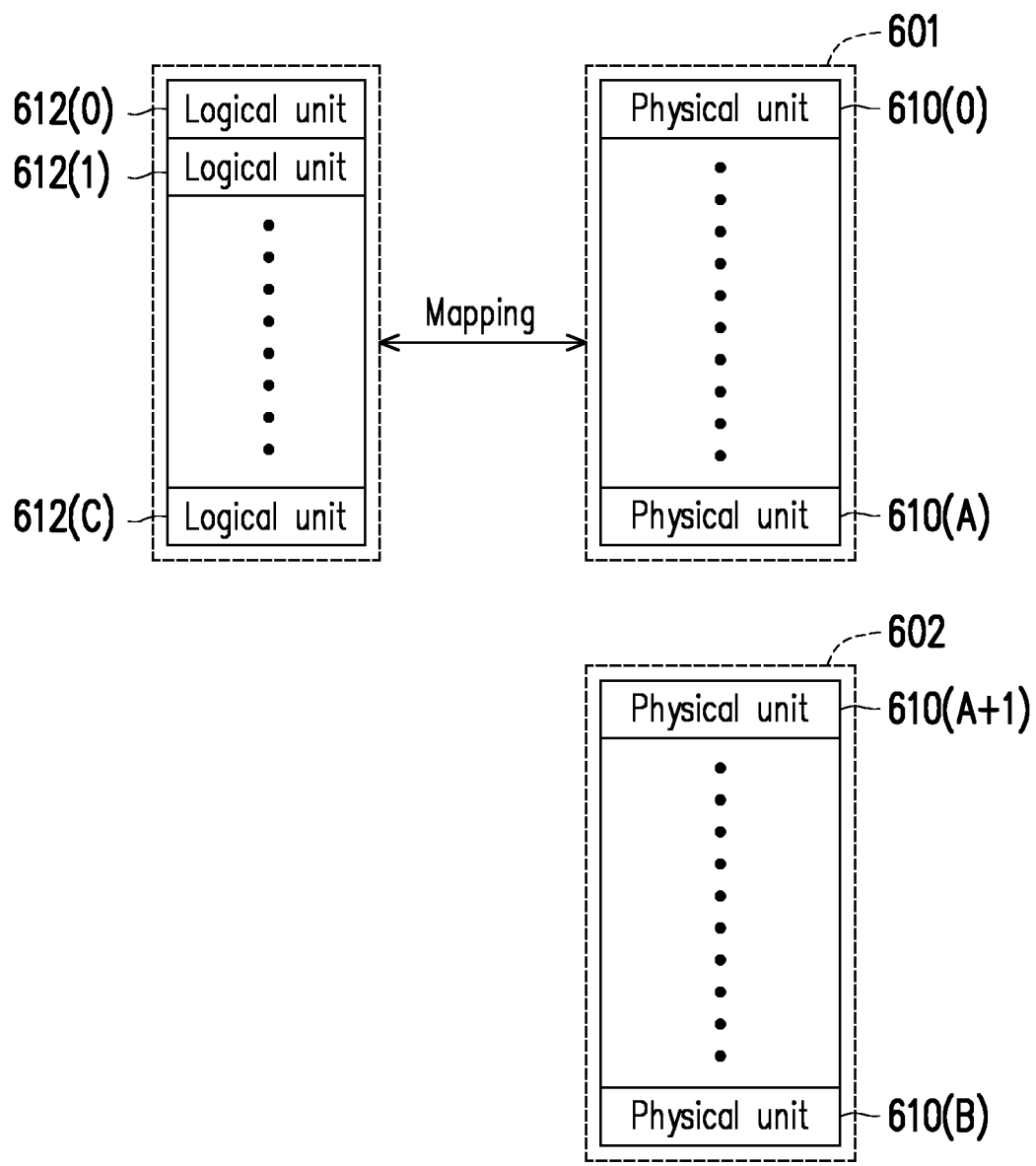
FIG. 6 is a schematic diagram illustrating management of a rewritable non-volatile memory module according to an exemplary embodiment of the disclosure.

FIG. 6 is a schematic diagram illustrating management of a rewritable non-volatile memory module according to an exemplary embodiment of the disclosure.

Referring to FIG. 6, the memory management circuit 502 logically groups physical units 610(0) to 610(B) of the rewritable non-volatile memory module 406 into a storage area 601 and a replacement area 602. The physical units 610(0) to 610(A) in the storage area 601 are configured to store data, and the physical units 610(A+1) to 610(B) in the replacement area 602 are configured to replace damaged physical units in the storage area 601. For example, if data read from one physical unit contains excessive errors and cannot be corrected, the physical unit is regarded as a damaged physical unit. It is noted that if no physical erasing units are available in the replacement area 602, the memory management circuit 502 may declare the entire memory storage device 10 as in a write protect state, and data cannot be further written thereto.

In the present exemplary embodiment, each physical unit refers to a physical erasing unit. However, in another exemplary embodiment, a physical unit may refer to a physical address or a physical programming unit, or may consist of a plurality of consecutive or non-consecutive physical addresses. The memory management circuit 502 allocates logical units 612(0) to 612(C) to map to the physical units 610(0) to 610(A) in the storage area 601. In the present exemplary embodiment, each logical unit refers to a logical address. However, in another exemplary embodiment, a logical unit may refer to a logical programming unit or a logical erasing unit, or may consist of a plurality of consecutive or non-consecutive logical addresses. Moreover, each of the logical units 612(0) to 612(C) may be mapped to one or more physical units.

In the present exemplary embodiment, the memory management circuit 502 records a mapping relation between the logical units and the physical units (also referred to as a logical-physical address mapping relation) in at least one logical-physical address mapping table. When the host system 11 is to read the data from the memory storage device 10 or write the data to the memory storage device 10, the memory management circuit 502 may perform a data access operation on the memory storage device 10 according to the logical-physical address mapping table.

In the present exemplary embodiment, the host system 11 is installed with a developer tool program, and the host system 11 issues a developer command to the memory storage device 10 through the developer tool program to instruct the memory storage device 10 to perform specific system operations. It is noted that, before the memory storage device 10 receives the developer command, the memory storage device 10 authenticates the host system 11 through at least two handshake operations to verify whether the host system 11 is a legitimate owner of the developer tool program, and/or verify whether the host system 11 uses the legitimate developer tool program.

In the present exemplary embodiment, the handshake operations used to authenticate the host system 11 include a first handshake operation and a second handshake operation. The second handshake operation is performed after the host system 11 passes authentication of the first handshake operation. After the host system 11 passes the authentication of the first handshake operation and the second handshake operation, in a developer command transmission stage, the host system 11 may transmit the developer command to the memory storage device 10, and the memory storage device 10 may transmit data corresponding to the developer command to the host system 11. However, in another exemplary embodiment, the handshake operations used to authenticate the host system 11 further include more handshake operations, as long as the memory storage device 10 can authenticate the host system 11 through these handshake operations. Moreover, in an exemplary embodiment, the developer tool program and at least a portion of data used in the handshake operations are stored in a storage medium of the host system 11 in a hidden manner to prevent direct access (e.g., being copied to another device) by an attacker.

Figure 7:
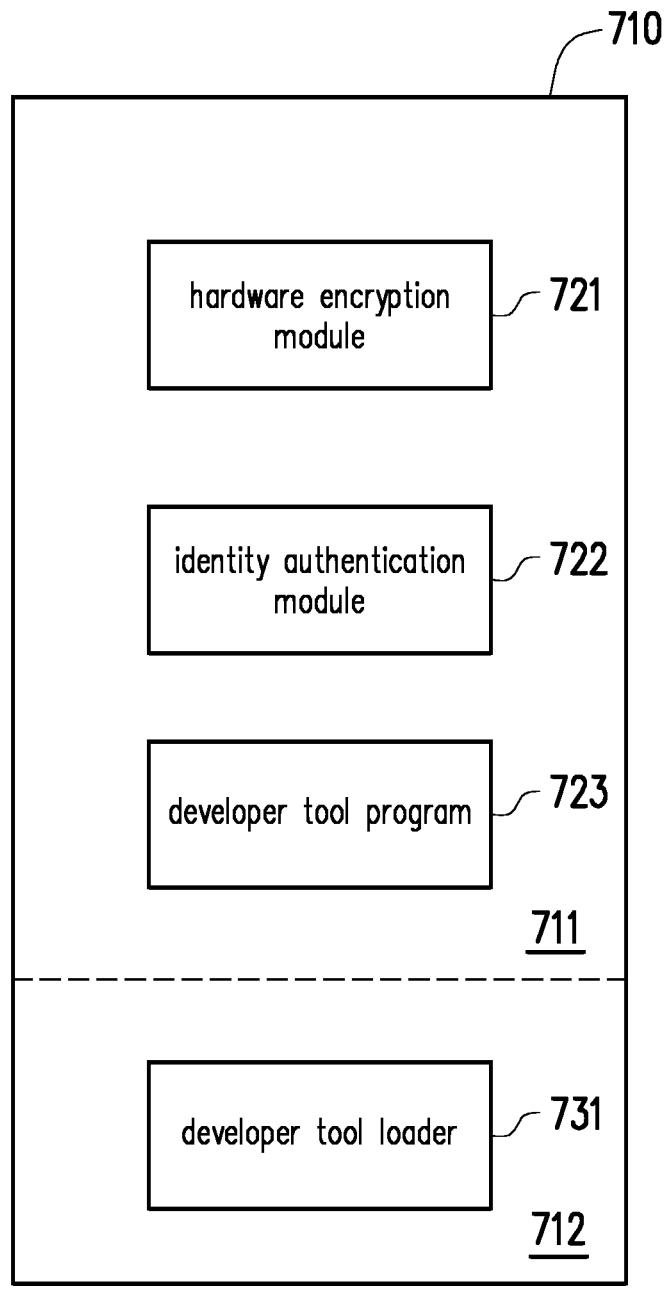
FIG. 7 is a schematic diagram illustrating a storage medium of a host system according to an exemplary embodiment of the disclosure.

FIG. 7 is a schematic diagram illustrating a storage medium of a host system according to an exemplary embodiment of the disclosure. Referring to FIG. 7, in the present exemplary embodiment, the host system 11 includes a storage medium 710. The storage medium 710 is, for example, an external storage device (e.g., a flash drive or an external hard drive) removably coupled to the host system 11, or is a storage circuit inside the host system 11. The storage medium 710 includes a hidden storage area 711 and a normal storage area 712. The hidden storage area 711 stores a hardware encryption module 721, an identity authentication module 722, and a developer tool program 723. The normal storage area 712 stores a developer tool loader 731.

It is noted that in the following description, some terms may be replaced with corresponding abbreviations for ease of reading (see Table 1).

TABLE 1

| | |
|---|---|
| memory management circuit | MMC |
| hardware encryption module | HEM |
| identity authentication module | IAM |
| developer tool program | DTP |
| developer tool loader | DPL |

In the present exemplary embodiment, the hidden storage area 711 and the normal storage area 712 are hidden by default. In a hidden state, a user cannot access the hidden storage area 711 and the normal storage area 712 through a file system of the host system 11. The IAM 722 stores identity authentication information. For example, the identity authentication information includes a default account and a default password. In the present exemplary embodiment, the IAM 722 receives identity information inputted by the user through a signal input device of the host system 11 and authenticates the inputted identity information based on the identity authentication information. For example, the IAM 722 compares an account inputted by the user with the default account and compares a password inputted by the user with the default password. If the account inputted by the user is identical to the default account and the password inputted by the user is identical to the default password, the IAM 722 removes the hidden state of the normal storage area 712. Conversely, if the account inputted by the user is different from the default account and/or the password inputted by the user is different from the default password, the IAM 722 maintains the normal storage area 712 in the hidden state.

After the hidden state of the normal storage area 712 is removed, the user can access the normal storage area 712 through a logical address corresponding to the normal storage area 712 in the file system of the host system 11. Moreover, after the hidden state of the normal storage area 712 is removed, the DTL 731 may be enabled (or activated). It is noted that, whether the user inputs the correct identity information, the hidden storage area 711 always remains in the hidden state and cannot be accessed by the user. However, in another exemplary embodiment, it is also possible that the storage medium 710 does not adopt the hiding mechanism, does not hide the normal storage area 712 by default, or adopts another authentication mechanism to remove the hidden state of the normal storage area 712, and the disclosure is not limited hereto. A host system authentication method according to exemplary embodiments of the disclosure will be described below based on FIG. 5 and FIG. 7 with reference to FIG. 8 to FIG. 11.

Figure 8:
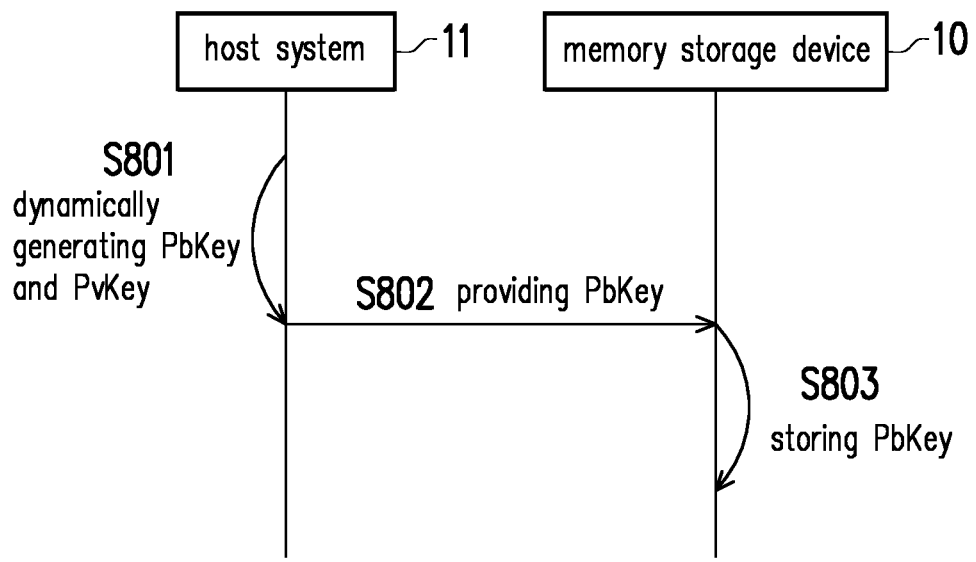
FIG. 8 is a schematic diagram illustrating an operation sequence of a preparation stage of a host system authentication method according to an exemplary embodiment of the disclosure.

FIG. 8 is a schematic diagram illustrating an operation sequence of a preparation stage of a host system authentication method according to an exemplary embodiment of the disclosure. Referring to FIG. 7 and FIG. 8, a preparation stage of a host system authentication method includes steps S801 to S803. In step S801, the HEM 721 dynamically generates key information PbKey (also referred to as first key information) and key information PvKey (also referred to as second key information) according to basic information. In an exemplary embodiment, the basic information is the identity authentication information stored in the IAM 722. However, in another exemplary embodiment, the basic information may also be a dynamically generated random number or another data, and the disclosure is not limited hereto.

In the present exemplary embodiment, the HEM 721 generates the key information PbKey and the key information PvKey based on the basic information by using a public-key cryptography algorithm. Therefore, the key information PbKey and the key information PvKey is an asymmetric key pair. For example, the key information PbKey is a public key of the asymmetric key pair, and the key information PvKey is a private key of the asymmetric key pair. However, in another exemplary embodiment, the HEM 721 may also generate the key information PbKey and the key information PvKey by using an encryption algorithm of another type or may generate key information by using a symmetric key encryption algorithm to be used in authentication, and the disclosure is not limited hereto.

In step S802, the host system 11 provides the generated key information PbKey to the memory storage device 10. On the other hand, the key information PvKey is stored in the hidden storage area 711. In step S803, the memory storage device 10 stores the key information PbKey. For example, the key information PbKey is stored in the rewritable non-volatile memory module 406 of FIG. 4. Now, the preparation stage of the host system authentication method is completed. Afterwards, once the DTL 731 is enabled, a first handshake operation of the host system authentication method is entered.

Figure 9:
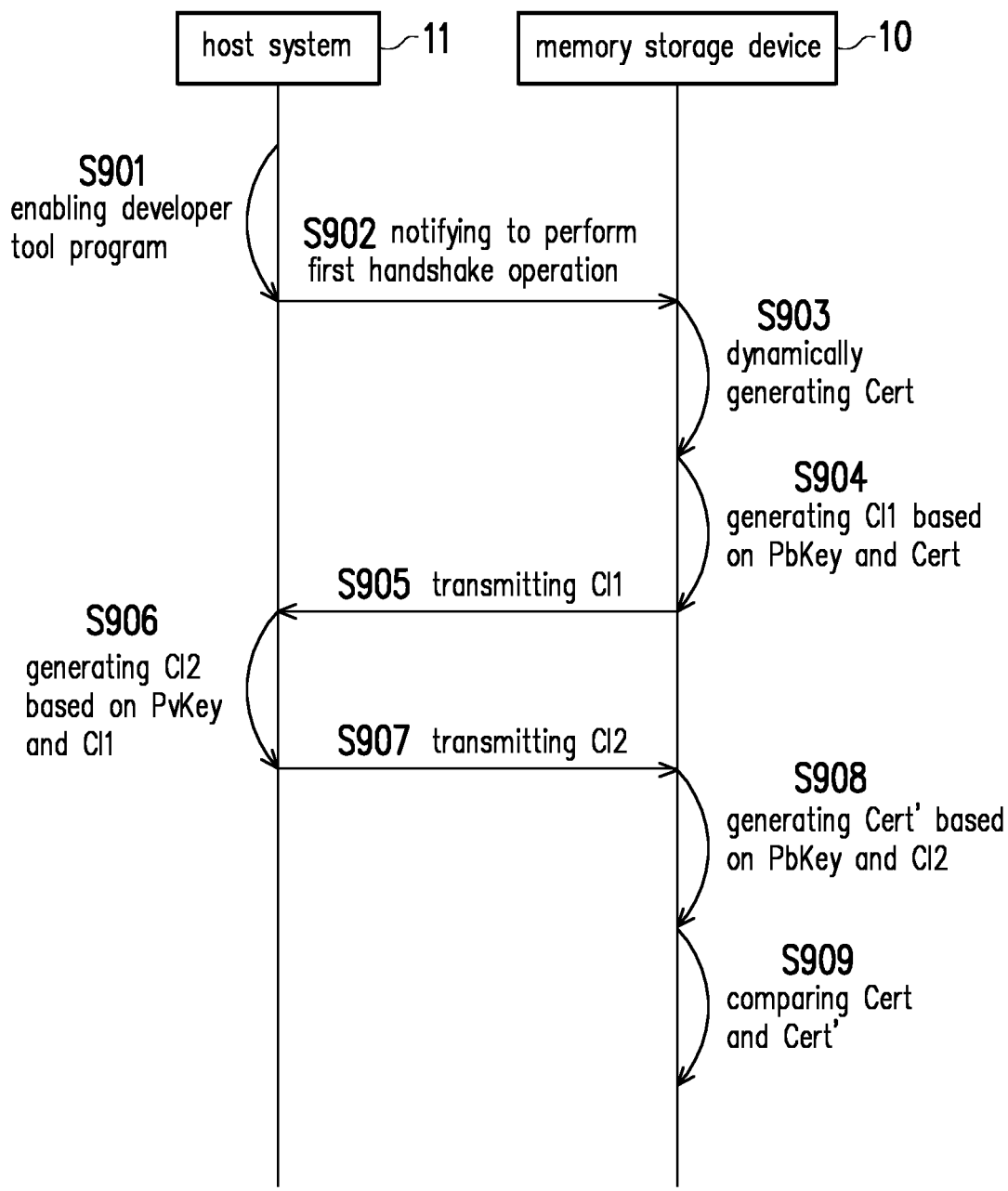
FIG. 9 is a schematic diagram illustrating an operation sequence of a first handshake operation of a host system authentication method according to an exemplary embodiment of the disclosure.

FIG. 9 is a schematic diagram illustrating an operation sequence of a first handshake operation of a host system authentication method according to an exemplary embodiment of the disclosure. Referring to FIG. 5, FIG. 7, and FIG. 9, a first handshake operation of a host system authentication method includes steps S901 to S909. In step S901, the DTL 731 of the host system 11 enables the DTP 723 in the hidden storage area 711. In step S902, the host system 11 (e.g., the enabled DTP 723) transmits a notification message to the memory storage device 10 to notify the memory storage device 10 to start performing the first handshake operation.

In step S903, the memory storage device 10 dynamically generates authentication information Cert (also referred to as first authentication information). For example, the authentication information Cert is one-time authentication information generated by the MMC 502. In step S904, the memory storage device 10 generates encrypted information CI1 (also referred to as first encrypted information) based on the key information PbKey and the authentication information Cert. For example, the authentication circuit 513 encrypts the authentication information Cert based on the key information PbKey by using the RSA encryption algorithm to generate the encrypted information CI1. In step S905, the memory storage device 10 transmits the encrypted information CI1 to the host system 11.

In step S906, the host system 11 receives the encrypted information CI1, and generates encrypted information CI2 (also referred to as second encrypted information) based on the key information PvKey and the encrypted information CI1. For example, the DTP 723 decrypts the encrypted information CI1 based on the key information PvKey by using the RSA encryption algorithm to obtain the authentication information Cert. Then, the DTP 723 encrypts the obtained authentication information Cert based on the key information PvKey by using the RSA encryption algorithm to generate the encrypted information CI2. In step S907, the host system 11 transmits the encrypted information CI2 to the memory storage device 10.

In step S908, the memory storage device 10 generates comparison information Cert' (also referred to as first comparison information) based on the key information PbKey and the encrypted information CI2. For example, the authentication circuit 513 decrypts the encrypted information CI2 based on the key information PbKey by using the RSA encryption algorithm to generate the comparison information Cert'. Then, the memory storage device 10 authenticates the host system 11 according to the authentication information Cert and the comparison information Cert'. For example, in step S909, the MMC 502 compares the authentication information Cert and the comparison information Cert'. If the authentication information Cert and the comparison information Cert' are identical, it means that the key information PvKey used by the host system 11 matches the key information PbKey used by the memory storage device 10. Accordingly, the MMC 502 determines that the host system 11 passes the authentication of the first handshake operation. Conversely, if the authentication information Cert and the comparison information Cert' are not identical, it means that the key information PvKey used by the host system 11 does not match the key information PbKey used by the memory storage device 10. Accordingly, the MMC 502 determines that the host system 11 does not pass the authentication of the first handshake operation. If the host system 11 passes the authentication of the first handshake operation, the MMC 502 allows entrance into a second handshake operation of the host system authentication method. Conversely, if the host system 11 does not pass the authentication of the first handshake operation, the MMC 502 does not allow entrance into the second handshake operation of the host system authentication method. In other words, in the first handshake operation, the MMC 502 uses the encrypted information CI2 to authenticate whether the host system 11 can perform the second handshake operation.

Figure 10:
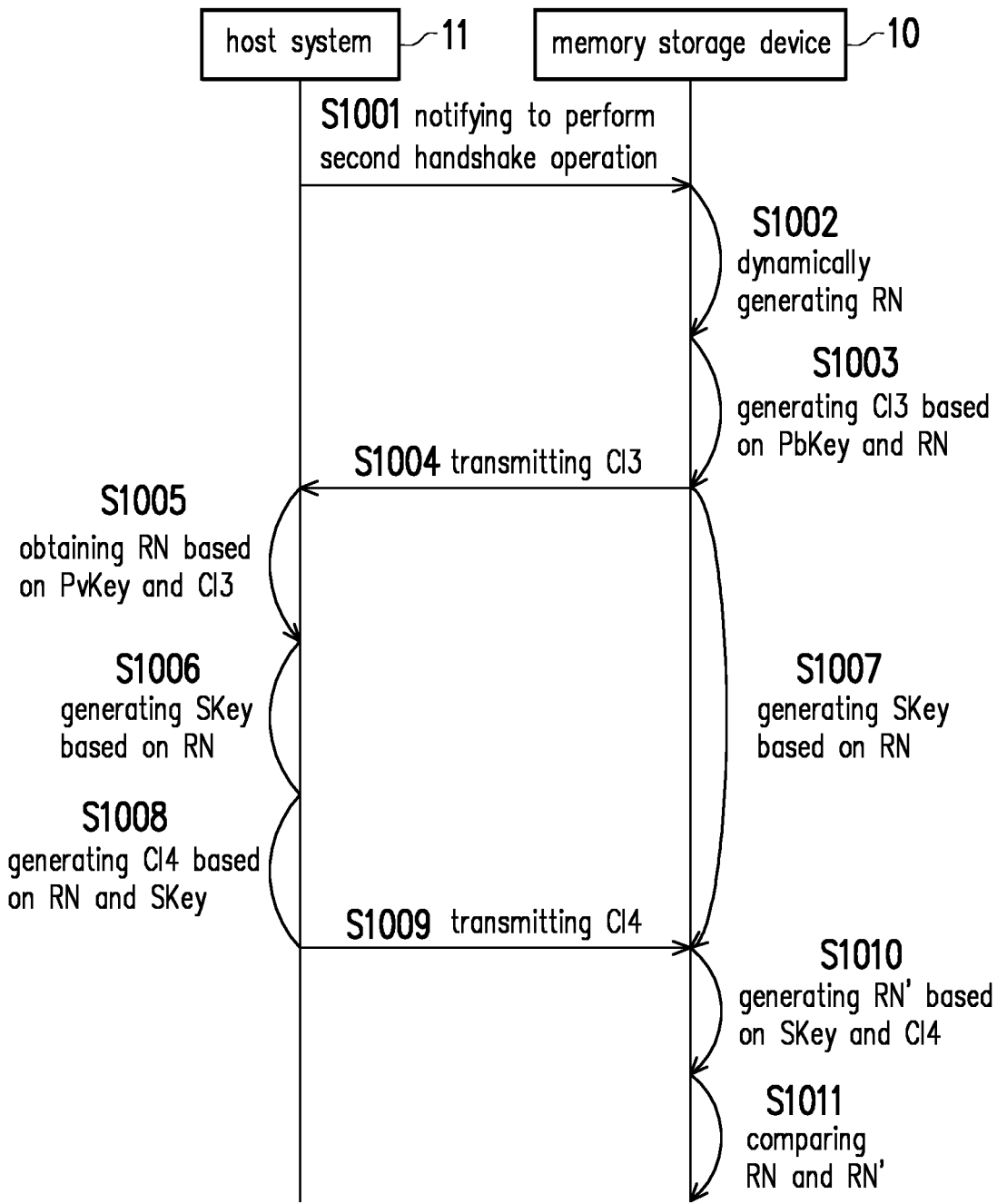
FIG. 10 is a schematic diagram illustrating an operation sequence of a second handshake operation of a host system authentication method according to an exemplary embodiment of the disclosure.

FIG. 10 is a schematic diagram illustrating an operation sequence of a second handshake operation of a host system authentication method according to an exemplary embodiment of the disclosure. Referring to FIG. 5, FIG. 7, and FIG. 10, a second handshake operation of the host system authentication method includes steps S1001 to S1011. In step S1001, the host system 11 notifies the memory storage device 10 to perform the second handshake operation. For example, the DTP 723 transmits an authentication request to the memory storage device 10.

After receiving the authentication request, in step S1002, the memory storage device 10 dynamically generates authentication information RN (also referred to as second authentication information). For example, the authentication information RN is one-time authentication information generated by the MMC 502. In step S1003, the memory storage device 10 generates encrypted information CI3 (also referred to as third encrypted information) based on the key information PbKey and the authentication information RN.

For example, the authentication circuit 513 encrypts the authentication information RN based on the key information PbKey by using the RSA encryption algorithm to generate the encrypted information CI3. In step S1004, the memory storage device 10 transmits the encrypted information CI3 to the host system 11.

In step S1005, the host system 11 receives the encrypted information CI3, and obtains the authentication information RN based on the key information PvKey and the encrypted information CI3. For example, the DTP 723 decrypts the encrypted information CI3 based on the key information PvKey by using the RSA encryption algorithm to obtain the authentication information RN. In step S1006, the host system 11 generates authentication information SKey (also referred to as third authentication information) based on the authentication information RN. For example, the DTP 723 dynamically generates the one-time authentication information SKey based on the authentication information RN and a key parameter.

In another exemplary embodiment, after the authentication information RN is generated, in step S1007, the memory storage device 10 generates authentication information SKey based on the authentication information RN. For example, the MMC 502 dynamically generates the one-time authentication information SKey based on the authentication information RN and a key parameter. It is noted that, in the present exemplary embodiment, the host system 11 and the memory storage device 10 use the same authentication information RN and the same key parameter to generate the authentication information SKey. Therefore, the generated authentication information SKey is also identical. The authentication information SKey is configured to encrypt data transmitted between the host system 11 and the memory storage device 10 in a subsequent developer command transmission stage.

In step S1008, the host system 11 generates encrypted information CI4 (also referred to as fourth encrypted information) based on the authentication information RN and the authentication information SKey. For example, the DTP 723 encrypts the authentication information RN based on the authentication information SKey by using the AES encryption algorithm to generate the encrypted information CI4. In step S1009, the host system 11 transmits the encrypted information CI4 to the memory storage device 10.

After receiving the encrypted information CI4, in step S1010, the memory storage device 10 generates comparison information RN' (also referred to as second comparison information) based on the authentication information SKey and the encrypted information CI4. For example, the authentication circuit 514 decrypts the encrypted information CI4 based on the authentication information SKey by using the AES encryption algorithm to generate the comparison information RN'. Then, the memory storage device 10 authenticates the host system 11 according to the authentication information RN and the comparison information RN'. For example, in step S1011, the MMC 502 compares the authentication information RN and the comparison information RN'. If the authentication information RN and the comparison information RN' are identical, it means that the key information PvKey used by the host system 11 matches the key information PbKey used by the memory storage device 10, and the host system 11 and the memory storage device 10 use the same authentication information SKey. Accordingly, the MMC 502 determines that the host system 11 passes the authentication of the second handshake operation. Conversely, if the authentication information RN and the comparison information RN' are not identical, it means that the key information PvKey used by the host system 11 does not match the key information PbKey used by the memory storage device 10, and/or the host system 11 and the memory storage device 10 do not use the same authentication information SKey. Accordingly, the MMC 502 determines that the host system 11 does not pass the authentication of the second handshake operation. If the host system 11 passes the authentication of the second handshake operation, the MMC 502 allows entrance into a developer command transmission stage of the host system authentication method. Conversely, if the host system 11 does not pass the authentication of the second handshake operation, the MMC 502 does not allow entrance into the developer command transmission stage of the host system authentication method. In other words, in the second handshake operation, the MMC 502 uses the encrypted information CI4 to authenticate whether the host system 11 can perform (or enter) the developer command transmission stage.

Figure 11:
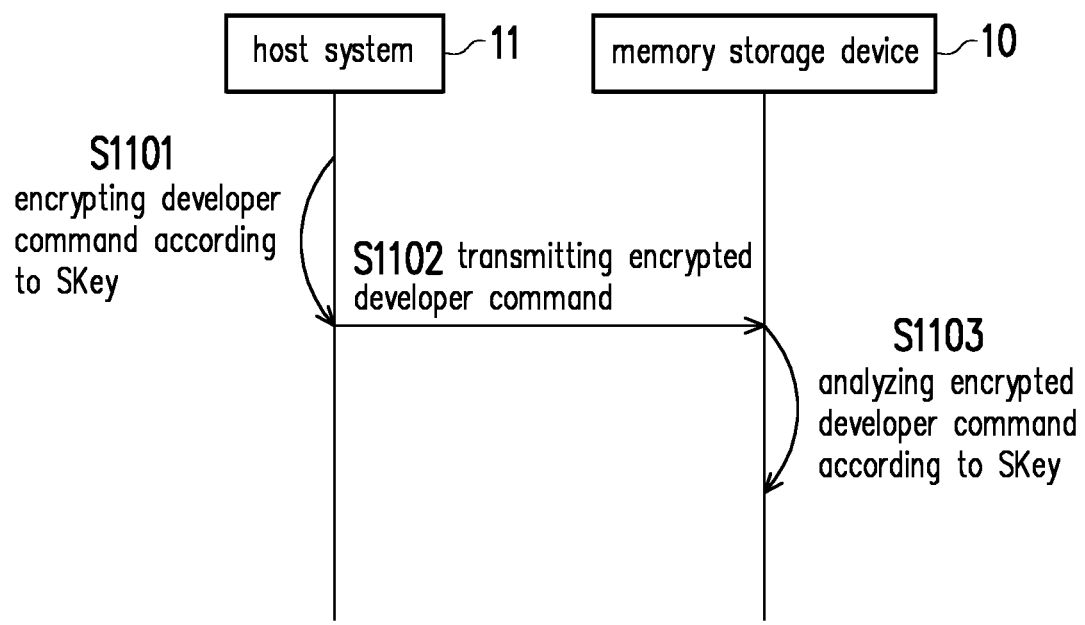
FIG. 11 is a schematic diagram illustrating an operation sequence of a developer command transmission stage of a host system authentication method according to an exemplary embodiment of the disclosure.

FIG. 11 is a schematic diagram illustrating an operation sequence of a developer command transmission stage of a host system authentication method according to an exemplary embodiment of the disclosure. Referring to FIG. 5, FIG. 7, and FIG. 11, a developer command transmission stage of the host system authentication method includes steps S1101 to S1103. In step S1101, the host system 11 encrypts a developer command according to the authentication information SKey. For example, the DTP 723 dynamically generates one or more developer commands, and the generated developer commands are configured to instruct the memory storage device 10 to perform specific system operations. The DTP 723 may encrypt the developer command based on the authentication information SKey by using the AES encryption algorithm. In step S1102, the host system 11 transmits the encrypted developer command to the memory storage device 10.

In step S1103, the memory storage device 10 receives the encrypted developer command, and analyzes the encrypted developer command according to the authentication information SKey. For example, the authentication circuit 514 decrypts the encrypted developer command based on the authentication information SKey by using the AES encryption algorithm. According to the decrypted developer command, the MMC 502 performs system operations such as a system parameter update, a firmware update, and/or transmitting a specific message back to the host system 11. Moreover, in another exemplary embodiment of FIG. 11, the authentication circuit 514 of the memory storage device 10 may also use the authentication information SKey to encrypt data to be transmitted to the host system 11, and the DTP 723 of the host system 11 may also use the same authentication information SKey to decrypt the data from the memory storage device 10, which shall not be further elaborated here.

From another perspective, in the first handshake operation as in FIG. 9, the memory storage device 10 authenticates the legitimacy of the host system 11 according to the authentication information Cert. In the second handshake operation as in FIG. 10, the memory storage device 10 authenticates the legitimacy of the host system 11 according to the authentication information RN. Moreover, in the developer command transmission stage as in FIG. 11, the memory storage device 10 analyzes the developer command received from the host system 11 according to the authentication information SKey. Specifically, the authentication information Cert, the authentication information RN, and the authentication information SKey are different from each other. For example, the authentication information Cert, the authentication information RN, and the authentication information SKey are respectively one-time random numbers generated in the corresponding operations/stages.

It is noted that although the examples of encryption/decryption are illustrated mainly with the RSA encryption algorithm working with the AES encryption algorithm in the foregoing exemplary embodiments, in another exemplary embodiment, the encryption algorithms adopted in the first handshake operation, the second handshake operation, and the developer command transmission stage may be the same or different algorithms and may all be adjusted according to the requirements in practice, and the disclosure is not limited hereto. In an exemplary embodiment, a data protection strength of the encryption algorithm (e.g., RSA) used for the encrypted information CI3 (i.e., the third encrypted information) is higher than a data protection strength of the encryption algorithm (e.g., AES) used for the encrypted information CI4 (i.e., the fourth encrypted information), but the disclosure is not limited hereto. In an exemplary embodiment, the encryption algorithms used for different encrypted information and the data protection strengths may all be adjusted according to the requirements in practice.

In an exemplary embodiment, an instruction set used by the host system 11 for communication with the memory storage device 10 in the developer command transmission stage is different from an instruction set used by the host system 11 for communication with the memory storage device 10 in a general command transmission stage. For example, in the developer command transmission stage, the host system 11 uses a specific instruction set (also referred to as a developer instruction set) to issue developer commands to the memory storage device 10 for instructing system operations such as a system parameter update, a firmware update, and returning a specific message. In the general command transmission stage, the host system 11 uses a general instruction set to issue general data access commands such as data reading, writing, and erasing to instruct the memory storage device 10 to perform corresponding data access operations. In an exemplary embodiment, the general command transmission stage is entered without the authentication of the first handshake operation and/or the second handshake operation. For example, in an exemplary embodiment, after a connection between the host system 11 and the memory storage device 10 is established, the general command transmission stage is automatically enabled, and the host system 11 may transmit general data access commands in the general command transmission stage.

Figure 12:
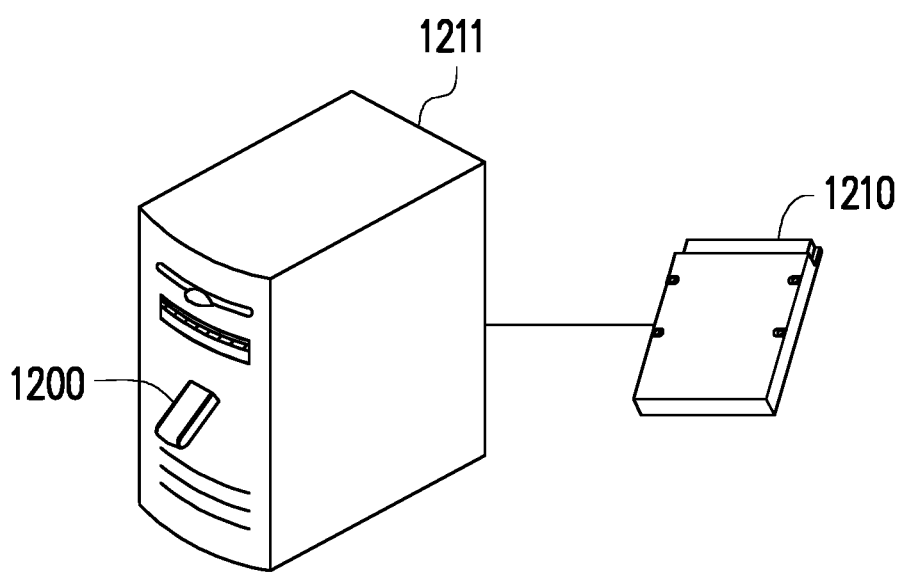
FIG. 12 is a schematic diagram illustrating a memory storage system according to an exemplary embodiment of the disclosure.

FIG. 12 is a schematic diagram illustrating a memory storage system according to an exemplary embodiment of the disclosure. Referring to FIG. 12, in the present exemplary embodiment, an external storage device 1200 is identical or similar to the storage medium 710 of FIG. 7. After the external storage device 1200 is electrically connected to a host system 1211, the host system 1211 performs the first handshake operation described in the foregoing exemplary embodiments with a memory storage device 1210 through the external storage device 1200. If the host system 1211 passes the authentication of the first handshake operation, the host system 1211 further performs the second handshake operation described in the foregoing exemplary embodiments with the memory storage device 1210 through the external storage device 1200. If the host system 1211 also passes the authentication of the second handshake operation, the host system 1211 further performs encrypted communication with the memory storage device 1210 through the external storage device 1200 in the developer command transmission stage to transmit developer commands.

Figure 13:
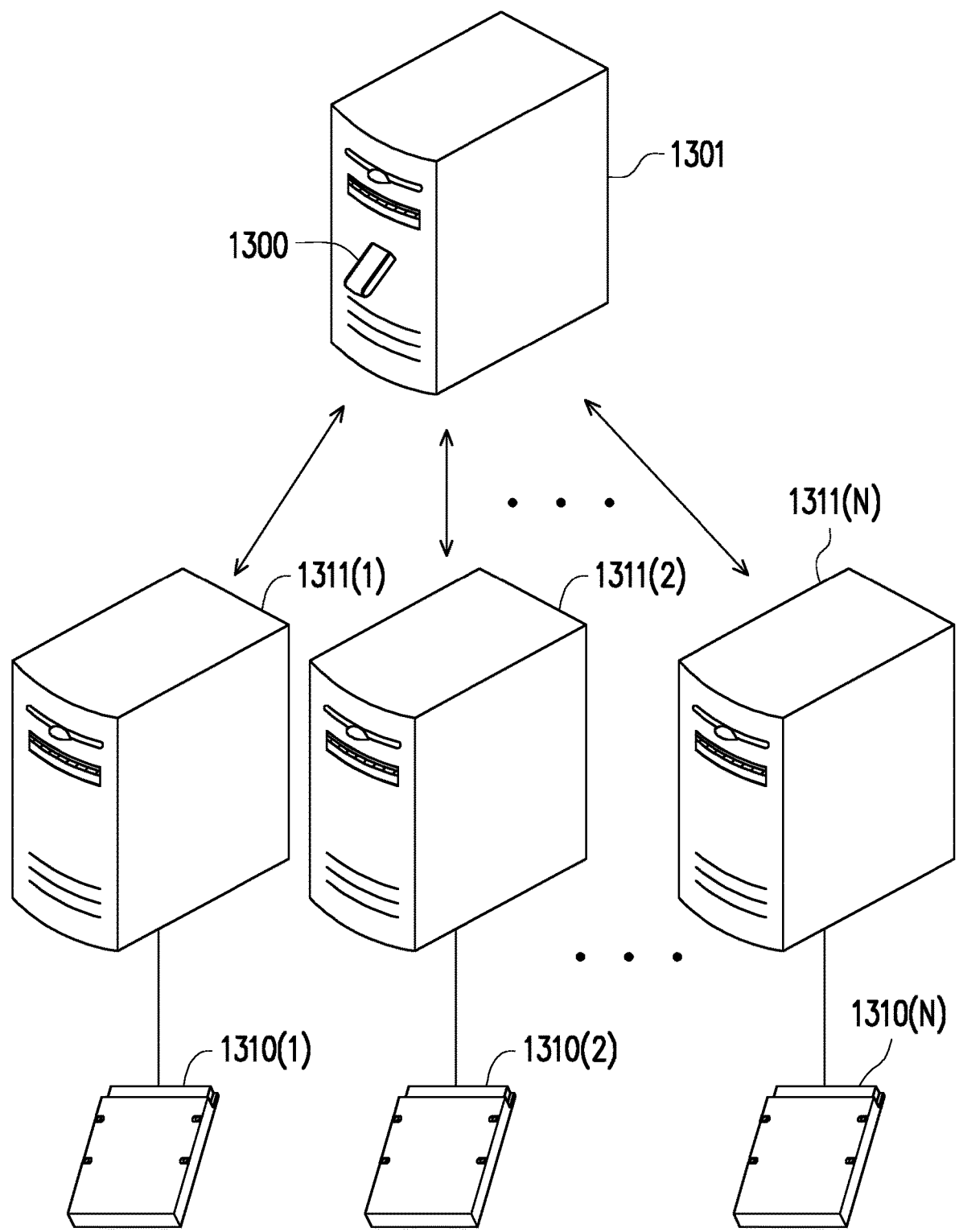
FIG. 13 is a schematic diagram illustrating a memory storage system according to another exemplary embodiment of the disclosure.

FIG. 13 is a schematic diagram illustrating a memory storage system according to another exemplary embodiment of the disclosure. Referring to FIG. 13, in the present exemplary embodiment, an external storage device 1300 is identical or similar to the storage medium 710 of FIG. 7. After the external storage device 1300 is electrically connected to a host system 1301, the host system 1301 downloads a DTP stored in the external storage device 1300 to host systems 1311(1) to 1311(N). Meanwhile, the host system 1301 provides at least a portion of information (e.g., the key information PvKey) in the external storage device 1300 that is used in the first handshake operation and the second handshake operation above to the host systems 1311(1) to 1311(N). The information from the host system 1301 (or the external storage device 1300) may be temporarily stored in buffer memories of the host systems 1311(1) to 1311(N). Accordingly, the host systems 1311(1) to 1311 (N) can perform the operations of FIG. 9 to FIG. 11 respectively with memory storage devices 1310(1) to 1310 (N) according to the DTP in respective buffer memories, which shall not be further elaborated here. For example, the exemplary embodiment of FIG. 13 may describe a scene where the memory storage devices 1310(1) to 1310(N) are produced or repaired at a production end.

In summary of the above, the memory storage device authenticates the host system in at least two handshake operations according to different authentication information, and the information transmitted in the handshake operations is encrypted. Moreover, through the handshake operations, the memory storage device and the host system exchange the authentication information configured to encrypt data and/or analyze the developer command in the developer command transmission stage, which thereby strengthens a capability of authenticating the host system by the memory storage device, and reduces a possibility for an attacker to successfully modify the parameters of the memory storage device by using an unauthorized developer program or steal the data in the memory storage device.

The previously described exemplary embodiments of the present disclosure have the advantages aforementioned, wherein the advantages aforementioned not required in all versions of the disclosure.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A memory storage system, comprising:
a host system; and
a memory storage device, coupled to the host system,
wherein in a first handshake operation, the memory storage device is configured to transmit first encrypted information corresponding to first authentication information to the host system, the host system is configured to transmit second encrypted information corresponding to the first authentication information to the memory storage device, and the memory storage device authenticates the host system according to both of the first authentication information and the second encrypted information transmitted from the host system and allows the host system to perform a second handshake operation after the host system passes authentication of the first handshake operation,
wherein in the second handshake operation, the memory storage device is configured to transmit third encrypted information corresponding to second authentication information to the host system, the host system is configured to receive the third encrypted information from the memory storage device and then transmit fourth encrypted information corresponding to third authentication information to the memory storage device based on the third encrypted information, and the memory storage device authenticates the host system according to both of the second authentication information and the fourth encrypted information transmitted from the host system and allows the host system to enter a developer command transmission stage after the host system passes authentication of the second handshake operation,
wherein the third authentication information is generated based on the second authentication information and configured to encrypt data transmitted between the host system and the memory storage device in the developer command transmission stage based on an encryption algorithm.

2. The memory storage system according to claim 1, wherein before entering the first handshake operation, the host system is further configured to dynamically generate first key information and second key infoiiiiation corresponding to the first key information, and the host system is further configured to provide the first key information to the memory storage device.

3. The memory storage system according to claim 2, wherein in the first handshake operation, the memory storage device is further configured to generate the first encrypted information based on the first key information and the first authentication information, and the host system is further configured to generate the second encrypted information based on the second key information and the first encrypted information.

4. The memory storage system according to claim 3, wherein in the first handshake operation, the memory storage device is further configured to generate first comparison information based on the first key information and the second encrypted information, and the memory storage device is further configured to authenticate the host system according to the first authentication information and the first comparison information.

5. The memory storage system according to claim 2, wherein in the second handshake operation, the memory storage device is further configured to generate the third encrypted information based on the first key information and the second authentication information, and the host system is further configured to obtain the second authentication information based on the second key information and the third encrypted information.

6. The memory storage system according to claim 5, wherein in the second handshake operation, the host system is further configured to generate the third authentication information based on the second authentication information, and the host system is further configured to generate the fourth encrypted information based on the second authentication infonnation and the third authentication information.

7. The memory storage system according to claim 6, wherein in the second handshake operation, the memory storage device is further configured to generate the third authentication information based on the second authentication information, and the memory storage device is further configured to generate second comparison information based on the third authentication information and the fourth encrypted information,
  wherein the memory storage device is further configured to authenticate the host system according to the second authentication information and the second comparison information.

8. The memory storage system according to claim 2, wherein the first key information and the second key information are an asymmetric key pair.

9. The memory storage system according to claim 1, wherein the host system comprises a developer tool program configured to perform the first handshake operation and the second handshake operation and generate a developer command in the developer command transmission stage, wherein the developer command is configured to instruct the memory storage device to perform a system operation.

10. The memory storage system according to claim 9, wherein the developer tool program is enabled through a developer tool loader, the developer tool program is stored in a hidden storage area of the host system, and the developer tool loader is stored in a normal storage area of the host system.

11. The memory storage system according to claim 10, wherein the hidden storage area and the normal storage area are both located in an external storage device, and the external storage device is removably coupled to the host system.

12. The memory storage system according to claim 1, wherein an instruction set used by the host system for communication with the memory storage device in the developer command transmission stage is different from an instruction set used by the host system for communication with the memory storage device in a general command transmission stage.

13. The memory storage system according to claim 1, wherein a data protection strength of an encryption algorithm used for the third encrypted information is higher than a data protection strength of an encryption algorithm used for the fourth encrypted information.

14. A host system authentication method for a memory storage device, the host system authentication method comprising:
  in a first handshake operation with a host system, transmitting first encrypted information corresponding to first authentication information to the host system, receiving second encrypted information corresponding to the first authentication information from the host system, and authenticating the host system according to both of the first authentication information and the second encrypted information transmitted from the host system and allowing the host system to perform a second handshake operation after the host system passes authentication of the first handshake operation;
  in the second handshake operation with the host system, transmitting third encrypted information corresponding to second authentication information to the host system and generating third authentication information based on the second authentication information, then receiving fourth encrypted information corresponding to the third authentication information from the host system, and then authenticating the host system according to both of the second authentication information and the fourth encrypted information transmitted from the host system and allowing the host system to enter a developer command transmission stage after the host system passes authentication of the second handshake operation; and
  in the developer command transmission stage, analyzing, based on an encryption algorithm, a developer command received from the host system according to the third authentication information.

15. The host system authentication method according to claim 14, further comprising:
  before entering the first handshake operation, storing first key information, wherein second key information corresponding to the first key information is stored in the host system.

16. The host system authentication method according to claim 15, further comprising:
  in the first handshake operation, generating the first encrypted information based on the first key information and the first authentication information.

17. The host system authentication method according to claim 16, further comprising:
  in the first handshake operation, generating first comparison information based on the first key information and the second encrypted information; and
  authenticating the host system according to the first authentication information and the first comparison information.

18. The host system authentication method according to claim 15, further comprising:
  in the second handshake operation, generating the third encrypted information based on the first key information and the second authentication information.

19. The host system authentication method according to claim 14, further comprising:
  in the second handshake operation,
  generating second comparison information based on the third authentication information and the fourth encrypted information; and
  authenticating the host system according to the second authentication information and the second comparison information.

20. The host system authentication method according to claim 15, wherein the first key information and the second key information are an asymmetric key pair.

21. The host system authentication method according to claim 14, wherein an instruction set used by the host system for communication with the memory storage device in the developer command transmission stage is different from an instruction set used by the host system for communication with the memory storage device in a general command transmission stage.

22. The host system authentication method according to claim 14, wherein a data protection strength of an encryption algorithm used for the third encrypted information is higher than a data protection strength of an encryption algorithm used for the fourth encrypted information.

23. A memory storage device comprising:
  a connection interface, configured to couple to a host system;
  a rewritable non-volatile memory module, comprising a plurality of physical units; and
  a memory control circuit, coupled to the connection interface and the rewritable non-volatile memory module,
  wherein in a first handshake operation with the host system, the memory control circuit is configured to transmit first encrypted information corresponding to first authentication information to the host system, receive second encrypted information corresponding to the first authentication information from the host system, and authenticate the host system according to both of the first authentication information and the second encrypted information transmitted from the host system and allow the host system to perform a second handshake operation after the host system passes authentication of the first handshake operation, wherein in the second handshake operation with the host system, the memory control circuit is further configured to transmit third encrypted information corresponding to second authentication information to the host system and generate third authentication information based on the second authentication information, then receive fourth encrypted information corresponding to the third authentication information from the host system, and then authenticate the host system according to both of the second authentication information and the fourth encrypted information transmitted from the host system, wherein in the developer command transmission stage, the memory control circuit is further configured to analyze, based on an encryption algorithm, a developer command received from the host system according to the third authentication information.

24. The memory storage device according to claim 23, wherein before entering the first handshake operation, the memory control circuit is further configured to store first key information, and second key information corresponding to the first key information is stored in the host system.

25. The memory storage device according to claim 24, wherein in the first handshake operation, the memory control circuit is further configured to generate the first encrypted information based on the first key information and the first authentication information.

26. The memory storage device according to claim 25, wherein in the first handshake operation, the memory control circuit is further configured to generate first comparison information based on the first key information and the second encrypted information, and authenticate the host system according to the first authentication information and the first comparison information.

27. The memory storage device according to claim 24, wherein in the second handshake operation, the memory control circuit is further configured to generate the third encrypted information based on the first key information and the second authentication information.

28. The memory storage device according to claim 23, wherein in the second handshake operation, the memory control circuit is further configured to generate second comparison information based on the third authentication information and the fourth encrypted information, and authenticate the host system according to the second authentication information and the second comparison information.

29. The memory storage device according to claim 24, wherein the first key information and the second key information are an asymmetric key pair.

30. The memory storage device according to claim 23, wherein an instruction set used by the host system for communication with the memory storage device in the developer command transmission stage is different from an instruction set used by the host system for communication with the memory storage device in a general command transmission stage.

31. The memory storage device according to claim 23, wherein a data protection strength of an encryption algorithm used for the third encrypted information is higher than a data protection strength of an encryption algorithm used for the fourth encrypted information.

32. A memory storage device comprising:
a connection interface, configured to couple to a host system;
a rewritable non-volatile memory module, comprising a plurality of physical units; and
a memory control circuit coupled to the connection interface and the rewritable non-volatile memory module,
wherein the memory control circuit is configured to authenticate the host system according to first authentication information in a first handshake operation with the host system,
wherein the memory control circuit is further configured to authenticate the host system according to second authentication information in a second handshake operation with the host system after the host system passes authentication of the first handshake operation,
wherein in a developer command transmission stage entered after the host system passes authentication of the second handshake operation, the memory control circuit is configured to analyze, based on an encryption algorithm, a developer command received from the host system according to third authentication information and the third authentication information is generated by the memory control circuit based on the second authentication information,
wherein the first authentication information, the second authentication information, and the third authentication information are different from each other.

* * * * *